(12) United States Patent
Stefanowski et al.

(10) Patent No.: US 11,542,039 B2
(45) Date of Patent: Jan. 3, 2023

(54) AVIATION COMPONENT INSPECTION USING IMAGE RECOGNITION

(71) Applicant: The Boeing Company, Chicago, IL (US)

(72) Inventors: Michal Stefanowski, Gdansk (PL); Lukasz Malinowski, Gdansk (PL); Ewelina Ośko, Gdansk (PL); Kamil Grzywinski, Gdansk (PL); Piotr Pawliszcze, Gdansk (PL)

(73) Assignee: THE BOEING COMPANY, Chicago, IL (US)

( * ) Notice: Subject to any disclaimer, the term of this patent is extended or adjusted under 35 U.S.C. 154(b) by 353 days.

(21) Appl. No.: 16/732,782

(22) Filed: Jan. 2, 2020

(65) Prior Publication Data
US 2021/0206515 A1 Jul. 8, 2021

(51) Int. Cl.
*B64F 5/60* (2017.01)
*G01M 5/00* (2006.01)
*G01N 29/22* (2006.01)

(52) U.S. Cl.
CPC ............ *B64F 5/60* (2017.01); *G01M 5/0016* (2013.01); *G01N 29/22* (2013.01); *G01N 2291/2694* (2013.01)

(58) Field of Classification Search
CPC .. G06V 10/17; G06V 10/768; G06V 2201/06; G06V 2201/08; B64F 5/60; G01M 5/00; G01M 5/0016; G01M 5/0033; G01N 21/8851; G01N 2021/8893; G01N 21/9515; G01N 21/8803
See application file for complete search history.

(56) References Cited

U.S. PATENT DOCUMENTS

| 10,037,712 | B2 * | 7/2018 | Dayal | H04N 5/2252 |
| 10,107,767 | B1 * | 10/2018 | Laughlin | G01N 23/18 |
| 10,664,722 | B1 * | 5/2020 | Sharma | G06V 20/00 |

FOREIGN PATENT DOCUMENTS

EP 3742336 A1 * 11/2020 ............. G06F 16/23

* cited by examiner

*Primary Examiner* — Son T Le
*Assistant Examiner* — Matthew W. Baca
(74) *Attorney, Agent, or Firm* — Alleman Hall Creasman & Tuttle LLP

(57) ABSTRACT

An aviation component inspection device includes a camera, a display, an input device, and a computer. The camera is configured to capture images of an aviation component under inspection. The computer is configured to receive an image from the camera, evaluate the image with one or more machine-learning aviation component-detection models. Each machine-learning aviation component-detection model is previously trained to output at least one confidence score indicating a confidence that a corresponding aviation component is present in the image. The computer is configured to present, via the display, a list of candidate aviation components based on corresponding confidence scores output by the one or more machine-learning aviation component-detection models, and add data previously-associated with a selected candidate aviation component from the list to a digital inspection report responsive to receiving user verification, via the input device, confirming the selected candidate aviation component is present in the image.

20 Claims, 9 Drawing Sheets

AVIATION COMPONENT INSPECTION USING IMAGE RECOGNITION

FIELD

The present disclosure relates generally to the field of aviation component inspection, and more specifically to semi-automated aviation component inspection.

BACKGROUND

Various aviation components of an aircraft may be inspected by a reliability engineer after a certain amount of time or usage to ensure that the aviation components are in working order. For example, a reliability engineer may go through a checklist of aviation components located in different parts of an aircraft. The reliability engineer may visually inspect each aviation component on the checklist and manually fill out an inspection report that indicates which aviation components require further attention (e.g., need to be replaced or repaired). Due to the manual nature in which the inspection reports are filled out, the information that is provided in the inspection reports may be inconsistent and/or difficult to use.

SUMMARY

According to one aspect of the present disclosure, an example aviation component inspection device is disclosed. The aviation component inspection device includes a camera, a display, an input device, and a computer. The camera is configured to capture images of an aviation component under inspection. The computer is configured to receive an image from the camera, evaluate the image with one or more machine-learning aviation component-detection models. Each machine-learning aviation component-detection model is previously trained to output at least one confidence score indicating a confidence that a corresponding aviation component is present in the image. The computer is configured to present, via the display, a list of candidate aviation components based on corresponding confidence scores output by the one or more machine-learning aviation component-detection models, and add data previously-associated with a selected candidate aviation component from the list to a digital inspection report responsive to receiving user verification, via the input device, confirming the selected candidate aviation component is present in the image.

The features, functions, and advantages that have been discussed can be achieved independently in various embodiments or may be combined in yet other embodiments, further details of which can be seen with reference to the following description and drawings.

DETAILED DESCRIPTION

The present description is directed to aviation component inspection devices and methods for generating digital inspection reports for aviation components. The aviation component inspection devices and corresponding methods use image recognition and machine learning techniques to comprehensively identify and classify aviation components under inspection to generate digital inspection reports for the aviation components in a fully automated or semi-automated manner. An aviation component can include any suitable component that is related to operation of an aircraft.

In some embodiments, the aviation component inspection devices and corresponding methods can populate the digital inspection reports with additional aviation component information in an automated manner. As one example, the aviation component inspection devices and corresponding methods can use image recognition and machine learning techniques to recognize an aviation component's operational status (e.g., working, degraded, requiring maintenance) that can be added to the digital inspection report for the aviation component. As another example, the aviation component inspection devices and corresponding methods can determine an aviation component's location based on one or both of machine-vision image analysis and information from a location sensor.

By generating digital inspection reports for aviation components in an automated manner using the image recognition and machine learning techniques described herein, accuracy can be increased compared to manual identification, classification, and entry of aviation components into inspection reports. Further, by generating digital inspection reports for aviation components in an automated manner, the time and effort to fill out an inspection report can be significantly reduced relative to a manual approach. Additionally, such digital inspection reports can have a standardized format that can facilitate accurate logging of the digital inspection reports into a data store that allows for global tracking of inspection information for numerous different aviation components from different aircraft.

Figure 1A:
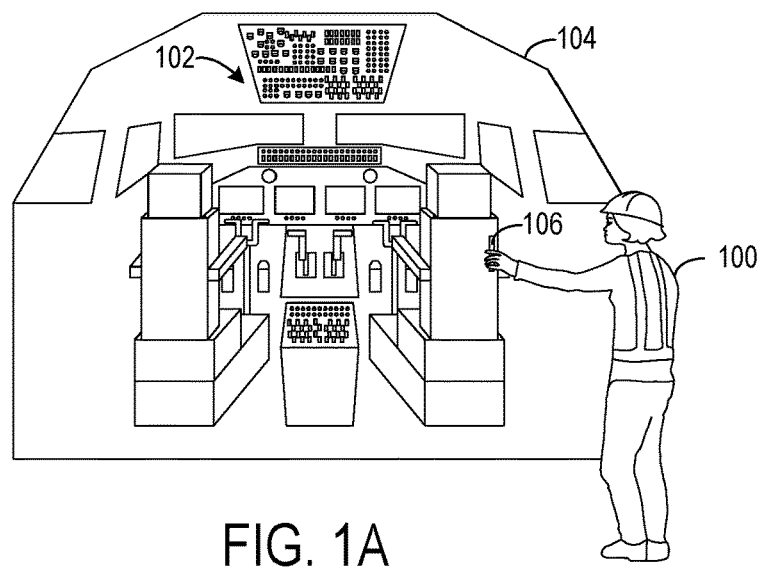
FIGS. 1A-1C are illustrations of different example scenarios in which aviation component inspection devices are used to perform aviation inspections on different parts of an aircraft.
Figure 1B:
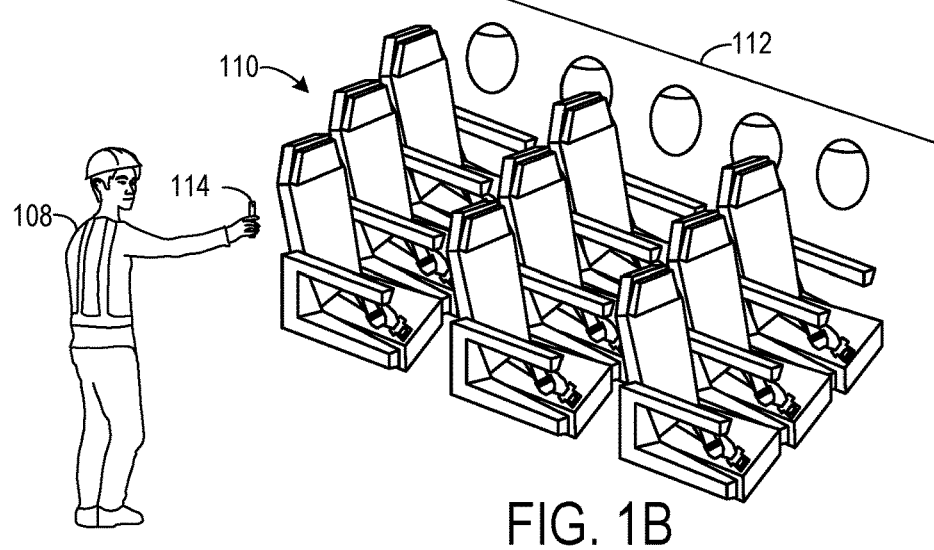
Figure 1C:
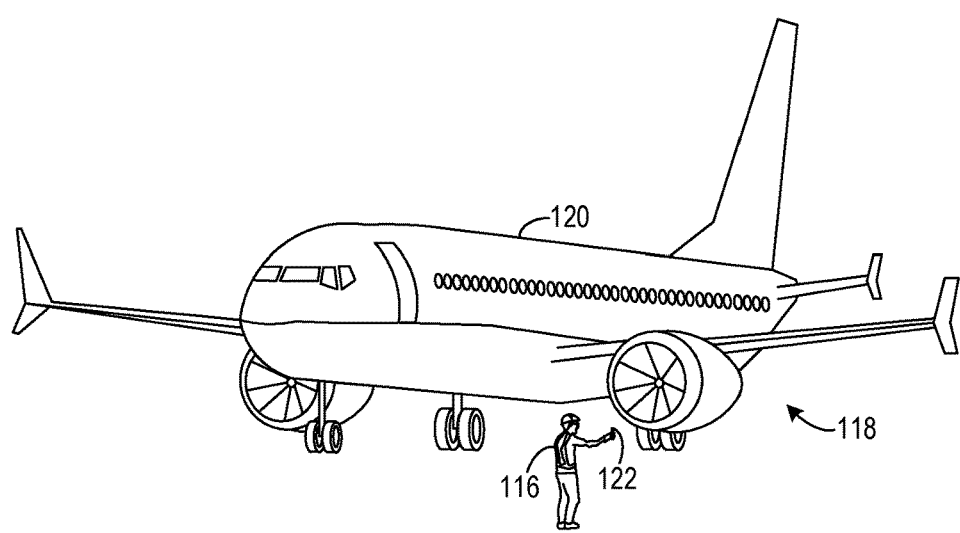

FIGS. 1A-1C show three different examples of aviation component inspection devices being used to perform aviation inspections on different parts of an aircraft. In FIG. 1A, a reliability engineer 100 images a plurality of aviation components 102 located in an aircraft cockpit 104 using an example aviation component inspection device 106. The plurality of aviation components 102 are included in an inspection checklist of aviation components that the reliability engineer 100 inspects in the aircraft cockpit 104. For example, the plurality of aviation components 102 can include gauges, monitors, pedals, switches, yoke, seats, and/or windows among other aviation components of the aircraft cockpit 104. The reliability engineer 100 images each of the plurality of aviation components 102 on the inspection checklist. The aviation component inspection device 106 evaluates each image using image recognition and machine learning techniques to identify an aviation component in the image and generates a digital inspection report for the aviation component based on confirmation from the reliability engineer 100.

In FIG. 1B, a reliability engineer 108 images a plurality of aviation components 110 located in an aircraft cabin 112 using an example aviation component inspection device 114.

The plurality of aviation components 110 are included in an inspection checklist of aviation components that the reliability engineer 108 inspects in the aircraft cabin 112. For example, the plurality of aviation components 110 can include seats, seat belts, windows, in-seat monitors, vents, and/or lights among other aviation components of the aircraft cabin 112. The reliability engineer 108 images each of the plurality of aviation components 110 on the inspection checklist. The aviation component inspection device 114 evaluates each image using image recognition and machine learning techniques to identify an aviation component in the image and generates a digital inspection report for the aviation component based on confirmation from the reliability engineer 108.

In FIG. 1C, a reliability engineer 116 is imaging a plurality of aviation components 118 located on an aircraft exterior 120 using an example aviation component inspection device 122. The plurality of aviation components 118 are included in an inspection checklist of aviation components that the reliability engineer 116 inspects on the aircraft exterior 120. For example, the plurality of aviation components 118 can include wings, flaps, turbines, doors, windows, landing gear, and/or tail among other aviation components of the aircraft exterior 120. The reliability engineer 116 images each of the plurality of aviation components 118 on the inspection checklist. The aviation component inspection device 122 evaluates each image using image recognition and machine learning techniques to identify an aviation component in the image and generates a digital inspection report for the aviation component based on confirmation from the reliability engineer 116.

The above described scenarios are provided as examples in which an aviation component inspection device can be used to perform inspections of different aviation components and generate corresponding digital inspection reports in an automated manner. An aviation component inspection device can be used to inspect any suitable aviation component in any suitable location in relation to an aircraft. In the illustrated examples, the aviation component inspection device is a hand-held device including a camera, such as a smartphone. The aviation component inspection device can take any suitable form.

Figure 2:
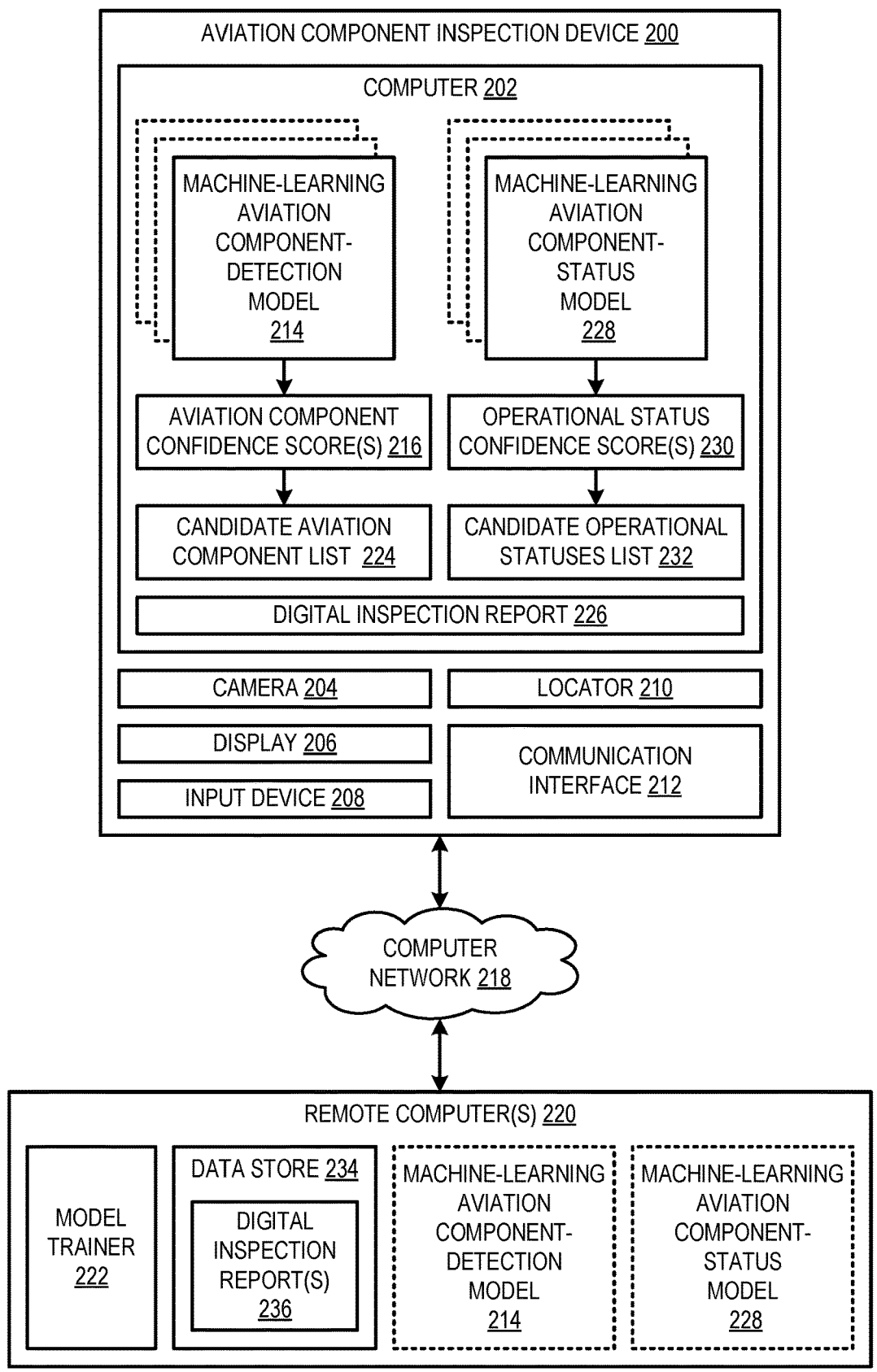
FIG. 2 is a diagrammatic representation of an exemplary embodiment of an aviation component inspection device.

FIG. 2 is a diagrammatic representation of an exemplary embodiment of an aviation component inspection device 200. The aviation component inspection device 200 comprises a computer 202, a camera 204, a display 206, an input device 208, a locator 210, and a communication interface 212. The computer 202 comprises one or more processors communicatively coupled with one or more memory devices. The one or more processors can be configured to execute instructions stored in the one or more memory devices. For example, the one or more processors can be configured to execute instructions that are part of one or more applications, services, programs, routines, libraries, objects, components, data structures, or other logical constructs. The one or more processors can be configured to execute software instructions. Additionally, or alternatively, the one or processors can be configured to execute hardware or firmware instructions. The one or more processors can be single-core or multi-core, and the instructions executed thereon can be configured for sequential, parallel, and/or distributed processing. The one or more storage device can include volatile, nonvolatile, dynamic, static, read/write, read-only, random-access, sequential-access, location-addressable, file-addressable, and/or content-addressable devices. Aspects of the one or more processors and the one or more memory devices can be integrated together into one or more hardware-logic components. Such hardware-logic components can include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

The camera 204 is configured to capture images of an aviation component under inspection. As one example, such an inspection can be performed during routine maintenance of an aircraft. As another example, such an inspection can be performed during/after manufacturing of the aviation component. An aviation component may be inspected in any suitable manner and at any suitable time using the aviation component inspection device 200. The camera 204 includes one or more optical sensors configured to capture digital images that facilitate machine vision for recognition of an aviation component under inspection. For example, the one or more optical sensors can include infrared, color, and/or depth sensing charge coupled devices.

The display 206 can include one or more display devices utilizing virtually any type of technology. Such display devices can be combined with the computer 202 and the camera 204 in a shared enclosure, or such display devices can be peripheral display devices.

The input device 208 includes or interfaces with one or more devices configured to translate human actions into computer-understandable information. Nonlimiting examples of input devices include a keyboard, mouse, track pad, button, dial, touchscreen, and/or computer interface (e.g., serial or universal serial bus) for interfacing with peripheral input devices. In some embodiments, the input device 208 can comprise or interface with selected natural user input (NUI) componentry. Such componentry can be integrated or peripheral, and the transduction and/or processing of input actions can be handled on- or off-board. Example NUI componentry can include a microphone for speech and/or voice recognition; an infrared, color, stereoscopic, and/or camera for machine vision and/or gesture recognition.

The locator 210 is configured to determine a position of the aviation component inspection device 200 and/or an aviation component under inspection. For example, the position can indicate whether the component inspection device 200 and/or an aviation component under inspection is located within the aircraft, for example, within a cockpit, an economy-class cabin, a business class cabin, a first class cabin, a galley, a crew rest compartment, a cargo bay, etc. and/or is located on the exterior portion of the aircraft. The location data can be more or less granular than the examples provided herein. The locator 210 can be implemented via software, hardware, or a combination thereof. In some embodiments, the locator 210 can comprise one or more location sensors including a global positioning system (GPS) and/or an inertial measurement unit (IMU) that can include one or more gyroscopes and/or accelerometers. In some embodiments, the locator 210 can be configured to determine the location of an aviation component under inspection based on information from the location sensor(s). In some embodiments, the locator 210 can be configured to determine the location of an aviation component based on machine-vision analysis of an image received from the camera 204. As one example, the locator 210 can be configured to perform simultaneous localization and mapping (SLAM) of a physical space and determine a location of an aviation component within the mapped physical space. In some embodiments, an aviation component can be outfitted with a location beacon, such as a radio frequency identification (RFID) tag. In such embodiments, the locator 210 can be configured to determine the position of the aviation component based on detecting signals from the corresponding RFID tag. In some embodiments, an aviation component can be outfitted with a digital watermark or other visually recognizable indicia that encodes a location of the aviation component under inspection. In such embodiments, the locator 210 can be configured to determine the position of the aviation component based on detecting the digital watermark. The locator 210 can determine a location of an aviation component in any suitable manner.

The communication interface 212 is configured to communicate data between the aviation component inspection device 200 and one or more remote computers 220 via a computer network 218 such that the aviation component inspection device 200 and one or more remote computers 220 are communicatively coupled. The communication interface 212 includes wired and/or wireless communication devices compatible with one or more different communication protocols. As non-limiting examples, the communication interface 212 can be configured for communication via a wireless telephone network, or a wired or wireless local- or wide-area network.

The aviation component inspection device 200 can take any suitable form. In some embodiments, the computer 202, the camera 204, the display 206, the input device 208, the locator 210, and the communication interface 212 are physically combined in a device enclosure having a mobile form factor, such as a smartphone or a tablet computer. In some embodiments, one or more elements can be peripheral to the computer. As one example, one or more cameras can be positioned in fixed locations throughout an aircraft to image different aviation components. For example, cameras can be positioned in a cockpit, cabin, galley, cargo bay, and/or other portions of an aircraft to image different aviation components. The different cameras can send images to the computer, which can be located on-board the aircraft or at another location (e.g., an offsite inspection facility) for evaluation. As another example, a camera can be moved throughout the aircraft (e.g., manually or robotically) to image different aviation components and the camera can send the images to the computer, which can be located on-board the aircraft or at another location for evaluation.

As discussed above, the aviation component inspection device 200 uses image recognition and machine learning techniques to comprehensively identify and classify aviation components. Additionally, in some embodiments, location data (e.g., determined by locator 210) optionally can be used in cooperation with the image recognition and machine learning techniques to determine and/or filter classification results of an aviation component under inspection. For example, if an image is acquired in a business class cabin of an aircraft as determined by the locator 210, then the machine-learning aviation component-detection model may be more likely to classify an aviation component in the image as a first type of tray table more commonly found in a business class cabin. On the other hand, if the image is acquired in an economy class cabin of the aircraft, then the machine-learning aviation component-detection model is more likely to classify the aviation component in the image as a second type of tray table more commonly found in an economy class cabin.

The computer 202 is configured to receive an image of an aviation component from the camera 204 and evaluate the image with one or more machine-learning aviation component-detection models 214. Each machine-learning aviation component-detection model of the one or more machine-learning aviation component-detection models 214 is previously trained to output at least one confidence score 216 indicating a confidence that a corresponding aviation component is present in the image. For example, a machine-learning aviation component-detection model 214 can be trained to output a confidence corresponding to a seat belt (e.g., 93% confident a seat belt is in an image). In some embodiments, the machine-learning aviation component-detection model(s) 214 are previously trained to output a plurality of confidence scores corresponding to different aviation components that can be present in the image (e.g., 93% confident a seat belt is in an image, 3% confident an air vent is in the image). In some embodiments, the machine-learning aviation component-detection model(s) 214 can be configured to identify two or more different aviation components in the same image and output one or more confidence scores for each such aviation component (93% confident a seat belt is in a first portion of an image; 88% confident an air vent is in second portion of the image).

The machine-learning aviation component-detection model(s) 214 can be previously trained to recognize any suitable type of aviation component in an image. Such aviation components can be located within an interior portion of an aircraft (e.g., cockpit, cabin, galley, lavatory, cargo bay) or on an exterior portion of an aircraft (e.g., nose, fuselage, wing, tail, engine, landing gear). In some embodiments, the machine-learning aviation component-detection model(s) 214 can be previously trained to collectively output a confidence score indicating a confidence for each different aviation component of an inspection checklist. For example, such an inspection checklist can be used in a maintenance routine for an aircraft to ensure that the aircraft is properly functioning. In some embodiments, the machine-learning aviation component-detection model(s) 214 can be previously trained to recognize different parts or features of a particular aviation component. In some embodiments, the machine-learning aviation component-detection model(s) 214 can be previously trained to recognize different aviation components listed in a data store for tracking aviation component inspection information (e.g., data store 234).

The machine-learning aviation component-detection model(s) 214 can employ any suitable combination of state-of-the-art and/or future machine learning (ML) and/or artificial intelligence (AI) techniques. Non-limiting examples of such techniques include convolutional neural networks (e.g., including spatial convolutional networks for processing images and/or videos), multi-layer neural networks, recurrent neural networks (e.g., long short-term memory networks), support vector machines, associative memories (e.g., lookup tables, hash tables, Bloom Filters, Neural Turing Machine and/or Neural Random Access Memory), unsupervised spatial and/or clustering methods (e.g., nearest neighbor algorithms, topological data analysis, and/or k-means clustering) and/or graphical models (e.g., Markov models, conditional random fields, and/or AI knowledge bases).

In some embodiments, the machine-learning aviation component-detection model(s) 214 uses a convolutional neural network to determine the confidence score(s) 216. The convolutional neural network includes a plurality of layers including an input layer, one or more hidden layers, and an output layer. The convolutional neural network is configured to convolve input vectors with one or more predefined, randomized and/or learned convolutional kernels included in hidden layer(s). By convolving the convolutional kernels with an input vector (e.g., a light intensity value for each pixel in an image is mapped to a dimension of the input vector), the convolutional neural network detects a feature associated with the convolutional kernel. For example, a convolutional kernel can be convolved with an image to detect low-level visual features such as lines, edges, corners, etc., based on various convolution operations with a plurality of different convolutional kernels. Convolved outputs of the various convolution operations can be processed by a pooling layer (e.g., max pooling) which can detect one or more most salient features at particular locations in the input image. Pooled outputs of the pooling layer can be further processed by further convolutional layers. The pooled outputs of the hidden layer(s) can be output to the output layer. The output layer can be configured to output the confidence score(s) 216 indicating the likelihood that the test image includes a specified aviation component based on the processing performed by the different hidden layers. Although the foregoing example is described with regard to a convolutional neural network, other neural network techniques can be used to detect a specified aviation component in an image.

In some embodiments, the methods and processes utilized by the machine-learning aviation component-detection model(s) 214 can be implemented using one or more differentiable functions, wherein a gradient of the differentiable functions can be calculated and/or estimated with regard to inputs and/or outputs of the differentiable functions (e.g., with regard to training data, and/or with regard to an objective function). Such methods and processes can be at least partially determined by a set of trainable parameters. Accordingly, the trainable parameters can be adjusted through any suitable training procedure, in order to continually improve the functionality of the machine-learning aviation component-detection model(s) 214.

In some embodiments, the methods and processes utilized by the machine-learning aviation component-detection model(s) 214 can be implemented using a statistical model, such as a support vector machine. The support vector machine can be configured to analyze an image of an aviation component by applying a series of different binary classifiers to determine whether or not the image includes a specified aviation component. The support vector machine can be trained using a set of training images, each marked as either including a specified aviation component or not including a specified aviation component. In another example, the machine-learning aviation component-detection model(s) 214 can be configured to use a statistical model that includes a nearest neighbor algorithm to determine the confidence score(s) 216.

The machine-learning aviation component-detection model(s) 214 are previously trained by a model trainer 222 executed on the remote computer(s) 220. The model trainer 222 can be configured to train the machine-learning aviation component-detection model(s) 214 according to any suitable training procedure. Non-limiting examples of training procedures for the machine-learning aviation component-detection model(s) 214 include supervised training (e.g., using gradient descent or any other suitable optimization method), zero-shot, few-shot, unsupervised learning methods (e.g., classification based on classes derived from unsupervised clustering methods), reinforcement learning (e.g., deep Q learning based on feedback) and/or based on generative adversarial neural network training methods. In some examples, a plurality of machine-learning aviation component-detection models can be trained simultaneously with regard to an objective function measuring performance of collective functioning of the plurality of components (e.g., with regard to reinforcement feedback and/or with regard to labeled training data), in order to improve such collective functioning. The machine-learning aviation component-detection model(s) 214 can be trained via supervised training on labeled training data comprising a set of images having a same structure as an input image. In other words, the training data comprises the same type of images as the images generated by the camera 204. The set of training data can be labeled with labels indicating whether or not a specified aviation component is present in the corresponding image. The machine-learning aviation component-detection model(s) 214 can be trained via supervised training on the set of training data with regard to an objective function measuring an accuracy, precision, and/or recall of locating specified object by the machine-learning aviation component-detection model(s) 214 as compared to actual locations of specified object(s) indicated in the labeled training data.

In some embodiments, the remote computer(s) 220 can send the trained machine-learning aviation component-detection model(s) 214 to the aviation component inspection device 200 via the computer network 218. The trained machine-learning aviation component-detection model(s) 214 can be stored locally in memory of the computer 202 such that the computer 202 can execute the trained machine-learning aviation component-detection model(s) 214 to on-board evaluate images without requiring network connectivity with the remote computer(s) 220.

In some embodiments, the trained machine-learning aviation component-detection model(s) 214 can be stored in memory of the remote computer(s) 220. The aviation component inspection device 200 can send images captured by the camera 204 to the remote computer(s) 220 for evaluation by the machine-learning aviation component-detection model(s) 214. The remote computer(s) 220 can output the confidence score(s) 216 and/or results derived from the confidence score(s) (e.g., a list of candidate aviation components) to the aviation component inspection device 200. In some such embodiments, the machine-learning aviation component-detection model(s) 214 can be configured as a service that the aviation component inspection device 200 can call upon via one or more application programming interfaces (APIs). In such some embodiments, such functionality can be incorporated into a web application accessible via a web browser.

The computer 202 is configured to present, via the display 206, a list 224 of candidate aviation components based on corresponding confidence scores 216 output by the machine-learning aviation component-detection model(s) 214. The list 224 of candidate aviation components can be selected in any suitable manner based on the corresponding confidence scores 216. As one example, a designated number (e.g., four) of aviation components having the highest confidence scores output by the model(s) 214 can be included in the list 224 of candidate aviation components. As another example, any candidate aviation component having a confidence score greater than a threshold score can be included in the list 224 of candidate aviation components. In some examples, the candidate aviation components can be ordered in the list 224 according to the confidences scores (e.g., the aviation components having the highest confidence score are at the top of the list). In some examples, the candidate aviation components can be presented along with the corresponding confidence scores. In other examples, the confidence scores are not revealed.

In some embodiments, the computer 202 can be configured to present, via the display 206, the image captured by the camera 204 at the same time as the list 224 of candidate aviation components so that the reliability engineer can visually compare the aviation component in the image with the list 224 of candidate aviation components. In some implementations, the candidate aviation component can be visually emphasized in such an image, such as by darkening and/or grayscaling pixels that do not display the candidate aviation component.

The computer 202 is configured to receive user verification, via the input device 208, confirming a selected candidate aviation component from the list 224 is present in the image. As one example, the user verification can include touch input via a touchscreen. As another example, the user verification can include audio input in the form of speech confirmation. Alternatively, the user verification can include user input identifying an aviation component not included in the list 224 of candidate aviation components. The user verification can take any suitable form.

The computer 202 is configured to generate a digital inspection report 226 for the selected candidate aviation component based on the user verification. The digital inspection report 226 provides a record of inspection of the selected candidate aviation component and includes information relating to the operational status of the selected candidate aviation component. Such information can be organized according to a standardized format or schema that facilitates uniformity across inspections of aircraft by different reliability engineers in different locations. In some examples, generating the digital inspection report 226 can include adding data previously-associated with the selected candidate aviation component to the digital inspection report 226. Virtually any type of data can be associated with a particular aviation component when the aviation component is added to the checklist of aviation components that are recognizable by the aviation component detection model. In this way, the previously-associated data (i.e., associated prior to component inspection) can be latter accessed for inclusion in an inspection report 226. For example, the data previously associated with the selected candidate aviation component can comprise an Air Transportation Association (ATA) identification code. In some examples, the ATA identification code can be retrieved from a look up table of ATA identification codes corresponding to different aviation components of the inspection checklist. Other example data that can be previously-associated with the aviation component includes characteristics of the aviation component such as size, weight, color, material composition, and stock number.

In some embodiments, the computer 202 can be configured to add a location of the selected candidate aviation component to the digital inspection report 226, wherein the location is determined by the locator 210. In some embodiments, the digital inspection report 226 can include the inspection image of the selected candidate aviation component, a timestamp detailed when the image was captured, and/or a timestamp detailing when the reliability engineer confirmed the identity and/or status of the candidate aviation component.

In some embodiments, the computer 202 is configured to further evaluate the image with one or more machine-learning aviation component-status models 228. Each machine-learning aviation component-status model of the one or more machine-learning aviation component-status models 228 is previously trained to output a confidence score 230 indicating a confidence that the selected candidate aviation component has a corresponding operational status. The machine-learning aviation component-status model(s) 228 can be previously trained to recognize any suitable operational status of a selected candidate aviation component. Non-limiting examples of recognizable operational status include functional, broken, degraded, and requires maintenance. In some examples, the operational status can be more specific to the particular function of the selected candidate aviation component.

The machine-learning aviation component-status model(s) 228 can employ any suitable combination of state-of-the-art and/or future machine learning (ML) and/or artificial intelligence (AI) techniques. The machine-learning aviation component-status model(s) 228 are trained by the model trainer 222. The model trainer 222 can train the machine-learning aviation component-status model(s) 228 using any suitable training procedure. In some examples, a single model can be trained to serve as both a machine-learning aviation component-detection model 214 and a machine-learning aviation component-status model 228.

In some embodiments, the trained machine-learning aviation component-status model(s) 228 can be stored in memory of the remote computer(s) 220. The aviation component inspection device 200 can send images captured by the camera 204 to the remote computer(s) 220 for evaluation by the machine-learning aviation component-status model(s) 228. The remote computer(s) 220 can output the confidence score(s) 230 and/or results derived from the confidence score(s) (e.g., a list of candidate operational statuses) to the aviation component inspection device 200. In some such embodiments, the machine-learning aviation component-status model(s) 228 can be configured as a service that the aviation component inspection device 200 can call upon via one or more APIs. In such some embodiments, such functionality can be incorporated to a web application accessible via a web browser.

The computer 202 is configured to present, via the display 206, a list 232 of candidate operational statuses based on corresponding confidence scores 230 output by the machine-learning aviation component-status model(s) 228. The computer 202 is configured to receive user verification, via the input device 208, confirming that the selected candidate aviation component has a selected operational status. As one example, the user verification can include touch input via a touchscreen. As another example, the user verification can include audio input in the form of speech. Alternatively, the user verification can include user input identifying an aviation component not included in the list 232 of candidate operational statuses. The user verification can take any suitable form. The computer 202 is configured to add the selected operational status of the selected candidate aviation component to the digital inspection report 226.

The computer 202 can be configured to present, via the display, the populated digital inspection report 226 for review by the reliability engineer. Further, the computer 202 can be configured to send the digital inspection report 226 to the remote computer(s) 220 for storage in a data store 234 of digital inspection reports 236 maintained by the remote computer(s) 220. In some embodiments where the models 214 and 228 are stored in memory of the remote computer(s) 220, the remote computer(s) 220 can be configured to generate the digital inspection report 226. In some such embodiments, the remote computer(s) can be configured to output the digital inspection report 226 to the aviation component inspection device 200. In some such embodiments, the remote computer(s) can be configured to output the digital inspection report 226 to the data store 234. The remote computer(s) 220 can be configured to aggregate digital inspection reports 236 from numerous aviation component inspection devices associated with different reliability engineers that perform inspections of aviation components of different aircraft at various locations. For example, the data store 234 of digital inspection reports 236 can be used by an aviation operator to support aircraft fleet maintenance.

In some embodiments, the computer 202 is configured to send the image, the user verification of the selected candidate aviation component (or user input identifying an aviation component not included in the list 224), and/or the user verification of the selected operational status of the selected candidate aviation component (or user input identifying an operational status not predicted by the machine-learning aviation component-status model(s) 228) to the model trainer 222. Further, the model trainer 222 can be configured to re-train the machine-learning aviation component-detection model(s) 214 and/or the machine-learning aviation component-status model(s) 228 based on at least the image and the user verification. For example, the model trainer 222 can be configured to aggregate images and user verification from a plurality of inspections and re-train the model(s) 214 and/or the model(s) 228 based on the aggregated data. For example, such re-training data can include positive, negative, and false positive identification of aviation components and/or operational statuses of aviation components. The model trainer 222 can be configured to send the retrained model(s) to the computer 202. The computer 202 can be configured to replace the machine-learning aviation component-detection model(s) with the updated, retrained machine-learning aviation component-detection models. Also, the computer 202 can be configured to replace the machine-learning aviation component-status model(s) with the updated, re-trained machine-learning aviation component-status model(s).

FIGS. 3-14 illustrate various example operations that can be performed by an aviation component inspection device 300 in the process of generating a digital inspection report for an aviation component under inspection. In the illustrated examples, the aviation component inspection device 300 takes the form of a hand-held computing device, such as a smartphone.

Figure 3:
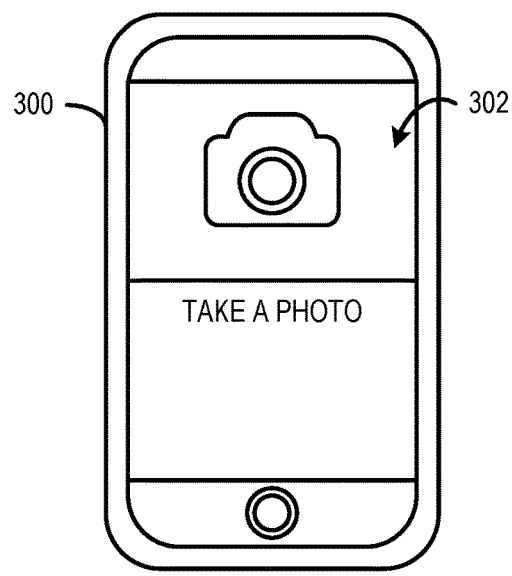
FIGS. 3-14 are diagrammatic representations illustrating various example operations that may be performed by an aviation component inspection device in the process of generating a digital inspection report for an aviation component under inspection.

In FIG. 3, the aviation component inspection device 300 presents a prompt 302 for a reliability engineer to capture an image of an aviation component via a camera. The aviation component inspection device 300 evaluates a captured image of the aviation component with one or more machine-learning aviation component-detection models. Each machine-learning aviation component-detection model is previously trained to output at least one confidence score indicating a confidence that a corresponding aviation component is present in the image.

Figure 4:
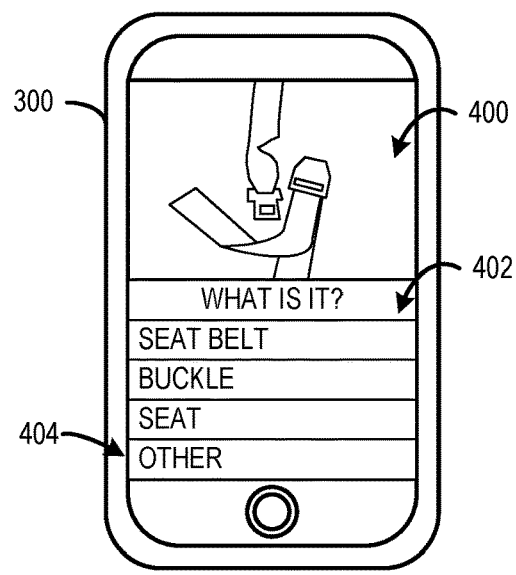

In FIG. 4, the aviation component inspection device 300 presents the captured image 400. In the depicted example, the image 400 includes an unbuckled seat belt. Additionally, the aviation component inspection device 300 presents a list 402 of candidate aviation components based on confidence scores output by machine-learning aviation component-status model(s). In the illustrated example, the candidate aviation components having the highest confidence scores are presented in the list 402. The list 402 of candidate aviation components includes a seat belt, a buckle, and a seat. The aviation component inspection device 300 presents an aviation component entry prompt 404 in addition to the list 402 of candidate aviation components. The aviation component entry prompt 404 can be selected to allow a reliability engineer to provide user input identifying an aviation component not included in the list 402 of candidate aviation components.

Figure 5:
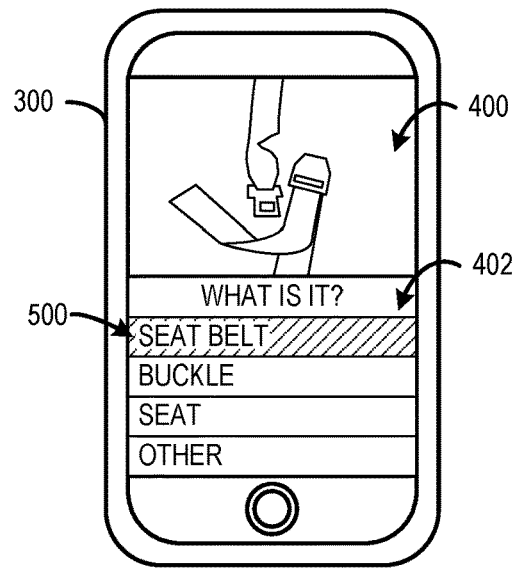

In FIG. 5, the aviation component inspection device 300 receives user verification 500 confirming a selected candidate aviation component from the list 402 is present in the image 400. The user verification 500 indicates that the aviation component is a seat belt. The aviation component inspection device 300 evaluates the image with one or more machine-learning aviation component-status models. Each machine-learning aviation component-status model is previously trained to output a confidence score indicating a confidence that the selected candidate aviation component has a corresponding operational status.

Figure 6:
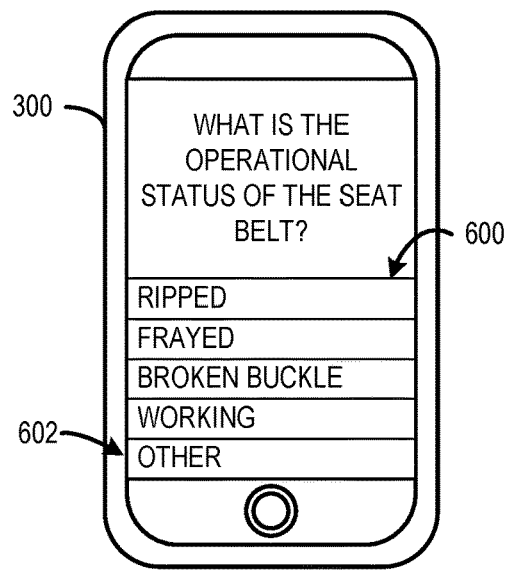

In FIG. 6, the aviation component inspection device 300 presents a list 600 of candidate operational statuses based on corresponding confidence scores output by the one or more machine-learning aviation component-status models. In the illustrated example, the candidate operational statuses having the highest confidence scores are presented in the list 600. The list 600 of candidate operational statuses includes ripped, frayed, broken buckle, and working operational statuses. Additionally, the aviation component inspection device 300 presents an operational status entry prompt 602 in addition to the list 600 of candidate operational statuses. The operational status entry prompt 602 can be selected to allow a reliability engineer to provide user input identifying an operational status of the selected candidate aviation component not included in the list 600 of candidate operational statuses.

Figure 7:
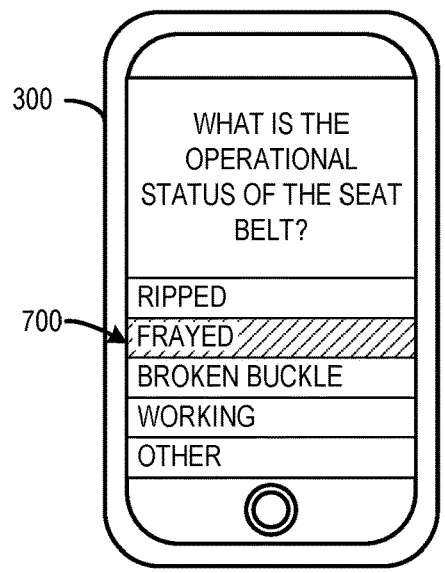

In FIG. 7, the aviation component inspection device 300 receives user verification 700 confirming that the selected candidate aviation component has a selected operational status. The user verification 700 indicates that the seat belt is frayed.

Figure 8:
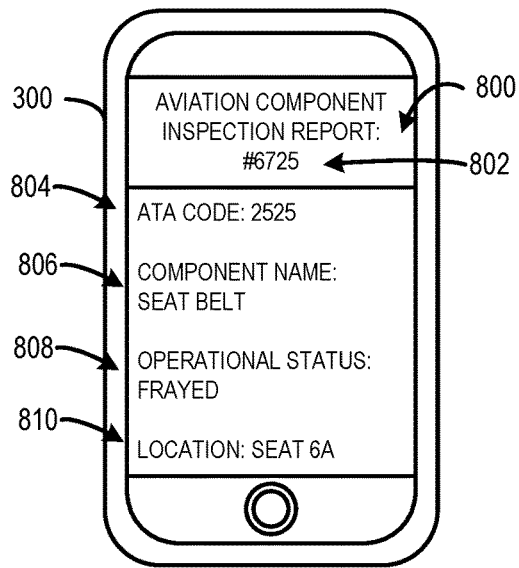

In FIG. 8, the aviation component inspection device 300 presents a digital inspection report 800 for the selected candidate aviation component. The digital inspection report 800 includes a log number 802 that can be used for tracking the digital inspection report in a data store of digital inspection reports. The digital inspection report 800 includes aviation component information comprising an ATA code 804, a standardized component name 806, an operational status 808, and a location 810 of the aviation component. In some implementations, such a report is not displayed during testing. In some implementations, the report includes a database, table, or other collection of information combining information pertaining to a plurality of different aviation component inspections.

Figure 9:
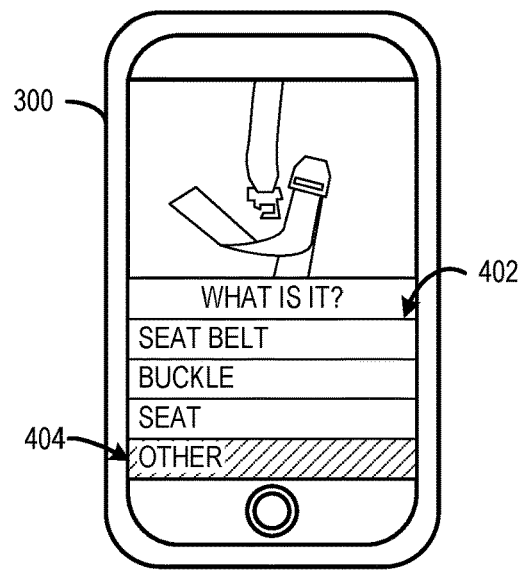
Figure 10:
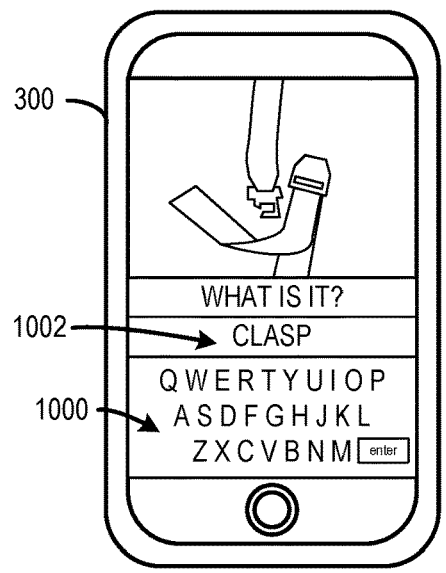
Figure 11:
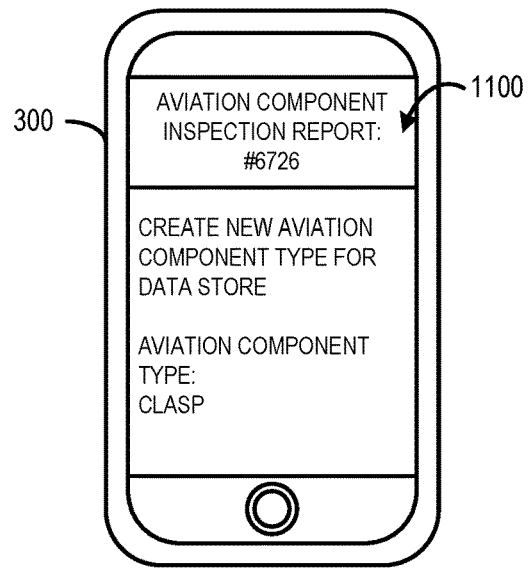

FIGS. 9-11 illustrate an example scenario where an aviation component not included in the list 402 of candidate aviation components is identified. In FIG. 9, the aviation component entry prompt 404 is selected instead of selecting a candidate aviation component from the list 402. In FIG. 10, the aviation component inspection device presents a virtual keyboard 1000 to allow a reliability engineer to provide user input 1002 identifying an aviation component not included in the list 402 of candidate aviation components. In some examples, the identified aviation component can be an aviation component that is not included in the inspection checklist and/or the data store of digital inspection reports. As such, in FIG. 11, a new aviation component profile 1100 can be created for the identified aviation component so that a digital inspection report can be generated for the identified aviation component and further the identified aviation component can be tracked in the data store. In other examples, the identified aviation component can have an existing aviation component profile, and the identified aviation component is merely omitted from the list 402 of candidate aviation components. As such, the options for manually adding a component can be limited to those components included in the inspection checklist and/or the data store of digital inspection reports. Either way, the user input identifying the aviation component can be sent to a model trainer to be used for re-training of the machine-learning aviation component-detection model(s).

Figure 12:
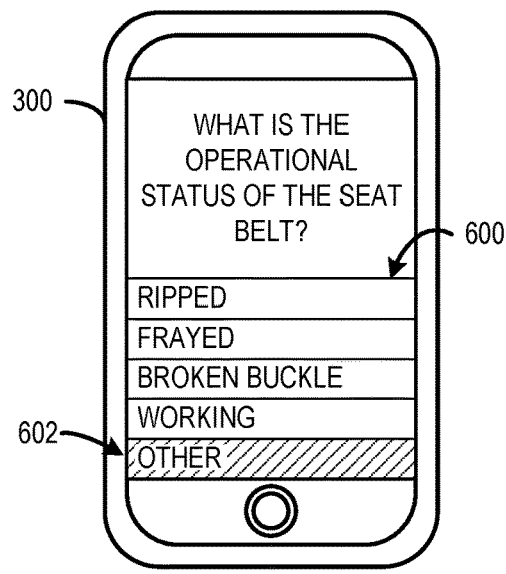
Figure 13:
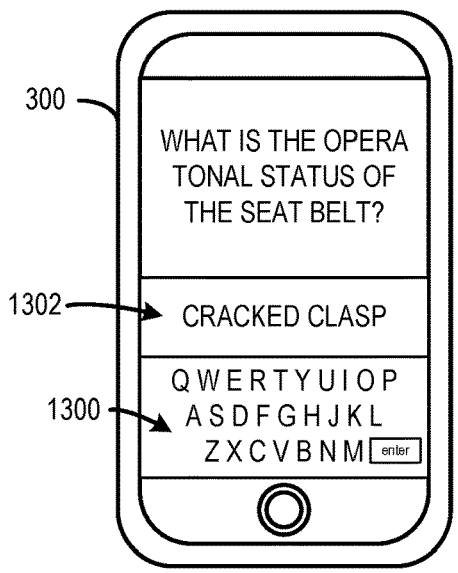
Figure 14:
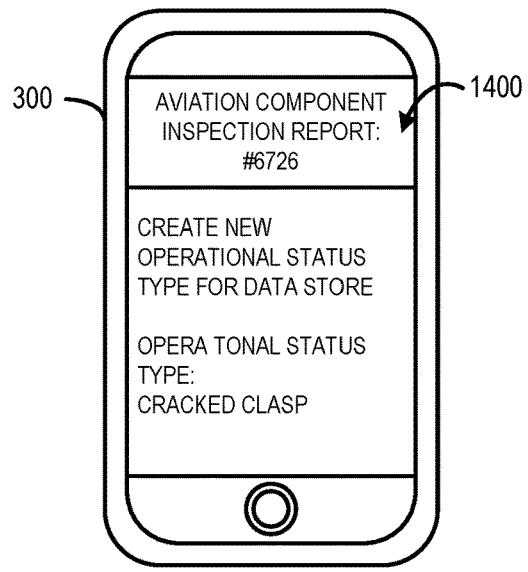

FIGS. 12-14 illustrate an example scenario where an operational status of a selected candidate aviation component not included in a list of candidate operational statuses is identified. In FIG. 12, the operational status entry prompt 602 is selected instead of selecting a candidate operational status from the list 600. In FIG. 13, the aviation component inspection device presents a virtual keyboard 1300 to allow a reliability engineer to provide user input 1302 identifying an operational status not included in the list 600 of candidate operational statuses. In some examples, the identified operational status can be an operational status that is not included in the inspection checklist and/or the data store of digital inspection reports. As such, in FIG. 14, a new operational status profile 1400 can be created for the identified operational status so that a digital inspection report can be generated that includes the identified operational status and further the identified operational status can be tracked in the data store. In other examples, the identified operational status can have an existing operational status profile, and the identified operational status is merely omitted from the list 600 of candidate operational statuses. As such, the options for manually adding an operational status of the aviation component can be limited to those operational statuses having profiles in the inspection checklist and/or the data store of digital inspection reports. Either way, the user input identifying the operational status can be sent to a model trainer to be used for re-training of the machine-learning aviation component-status model(s).

Figure 15:
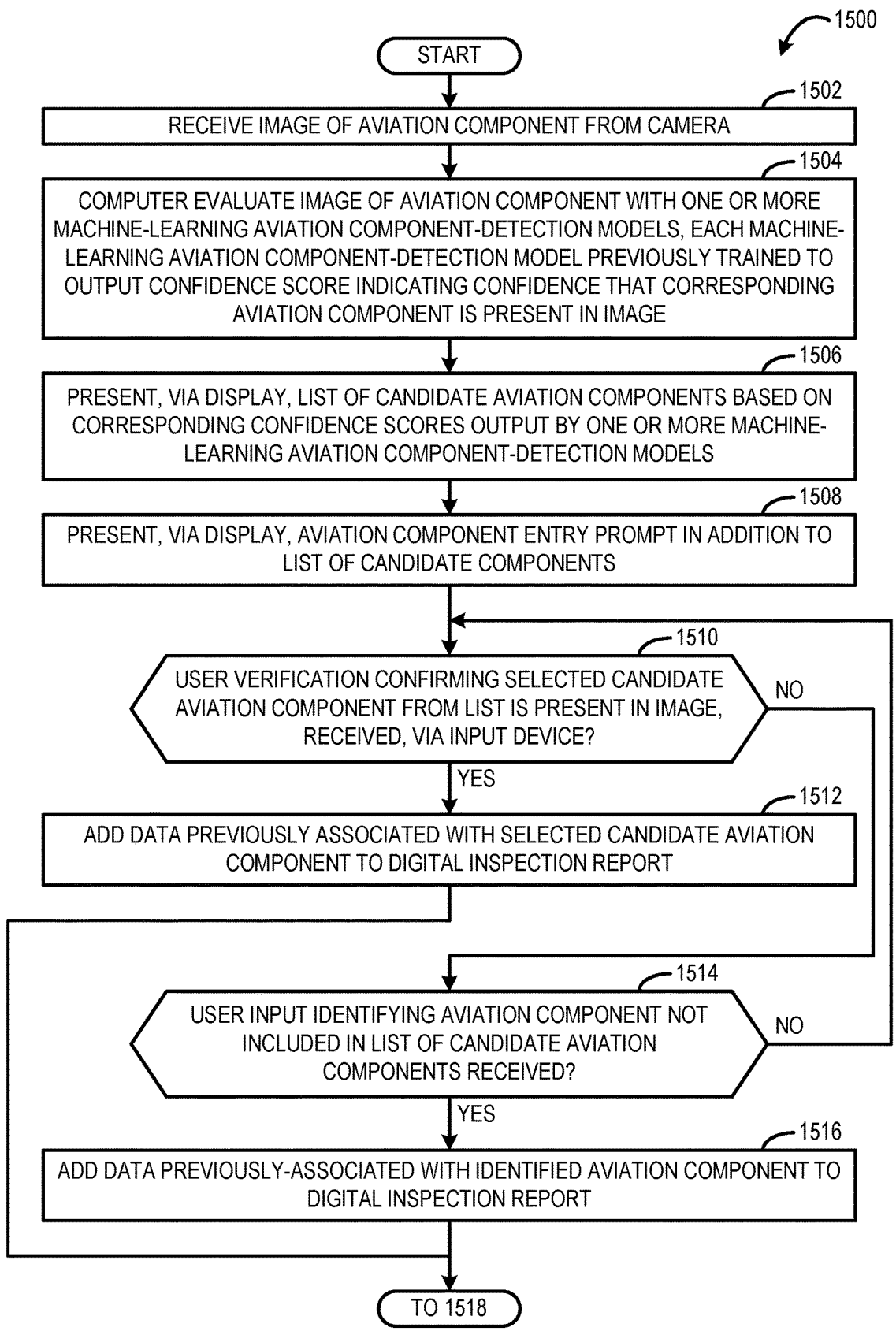
FIGS. 15-17 are a flowchart of an exemplary embodiment of a method for generating a digital inspection report for an aviation component under inspection.
Figure 16:
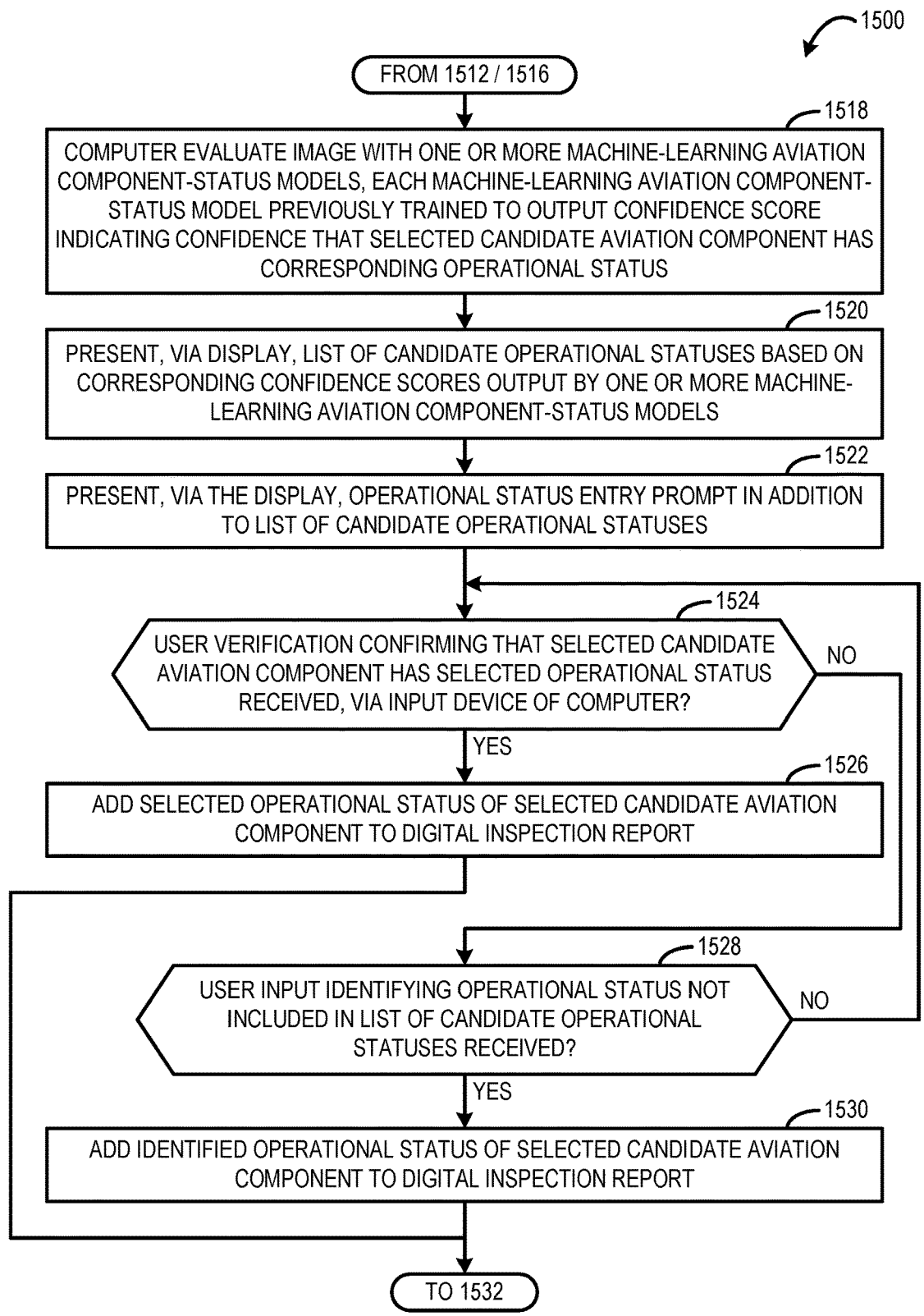
Figure 17:
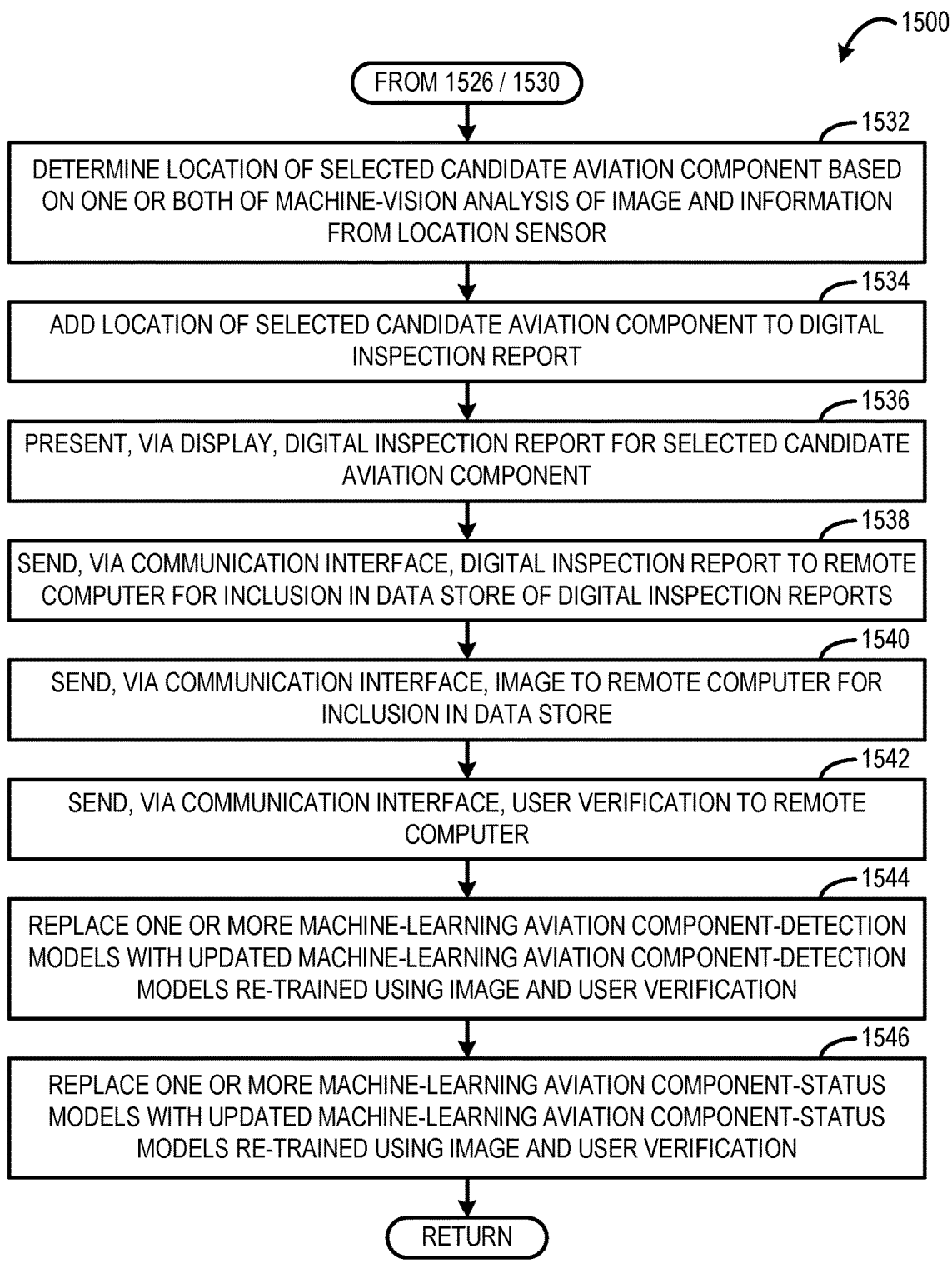

FIGS. 15-17 are a flowchart of an example method 1500 for generating a digital inspection report for an aviation component. For example, the method 1500 can be performed by the aviation component inspection device 106 shown in FIG. 1A, the aviation component inspection device 114 shown in FIG. 1B, the aviation component inspection device 122 shown in FIG. 1C, the aviation component inspection device 200 shown in FIG. 2, the aviation component inspection device 300 shown in FIGS. 3-14, or any other suitable aviation component inspection device. In FIG. 15 at 1502, an image of an aviation component is received from a camera. At 1504, the image of the aviation component is computer evaluated with one or more machine-learning aviation component-detection models. Each machine-learning aviation component-detection model of the one or more machine-learning aviation component-detection models is previously trained to output a confidence score indicating a confidence that a corresponding aviation component is present in the image. At 1506, a list of candidate aviation components is presented, via a display, based on corresponding confidence scores output by the one or more machine-learning aviation component-detection models. At 1508, an aviation component entry prompt optionally can be presented in addition to the list of candidate aviation components. At 1510, it is determined whether user verification is received via an input device. The user verification confirms that a selected candidate aviation component from the list is present in the image. If user verification is received, then the method 1500 moves to 1512. Otherwise, the method 1500 moves to 1514. At 1512, data-previously associated with the selected candidate aviation component is added to a digital inspection report for the selected candidate aviation component and the method 1500 moves to 1518 in FIG. 16. For example, the previously associated data can include an ATA code of the selected candidate aviation component. At 1514, it is determined whether user input identifying an aviation component not included in the list of candidate aviation components is received. If user input identifying an aviation component is received, then the method 1500 moves to 1516. Otherwise, the method 1500 returns to 1510. At 1516, data previously associated with the identified aviation component is added to a digital inspection report for the identified aviation component and the method 1500 moves to 1518 in FIG. 16.

In FIG. 16 at 1518, the image optionally can be computer evaluated with one or more machine-learning aviation component-status models. Each machine-learning aviation component-status model of the one or more machine-learning aviation component-status models is previously trained to output a confidence score indicating a confidence that the selected candidate aviation component has a corresponding operational status. At 1520, a list of candidate operational statuses optionally can be presented via the display based on corresponding confidence scores output by the one or more machine-learning aviation component-status models. At 1522, an operational status entry prompt optionally can be presented via the display in addition to the list of candidate operational statuses. At 1524, it is determined whether user verification is received via the user input device. The user verification confirms that the selected candidate aviation component has a selected candidate operational status from the list of candidate operational statuses. If user verification is received, then the method 1500 moves to 1526. Otherwise, the method 1500 moves to 1528. At 1526, the selected operational status of the selected candidate aviation component is added to the digital inspection report and the method moves to 1532 in FIG. 17. At 1528, it is determined whether user input identifying an operational status not included in the list of candidate operational statuses is received via the user input device. If user input identifying an operational status is received, then the method 1500 moves to 1530. Otherwise, the method 1500 returns to 1524. At 1530, the identified operational status of the selected candidate aviation component is added to the digital inspection report and the method 1500 moves to 1532 in FIG. 17.

In FIG. 17 at 1532, a location of the selected candidate aviation component is optionally determined based on one or both of machine-learning analysis of the image and information from a location sensor. At 1534, the location of the selected candidate aviation component is added to the digital inspection report. At 1536, the digital inspection report for the selected candidate aviation component optionally can be presented via the display. At 1538, the digital inspection report optionally can be sent, via a communication interface, to a remote computer for inclusion in a data store of digital inspection reports. At 1540, the image optionally can be sent, via the communication interface, to the remote computer for inclusion in the data store. At 1542, the user verification optionally can be sent, via the communication interface, to the remote computer.

The image and the user verification optionally can be used by the remote computer to re-train one or more of the machine-learning aviation component detection model(s) and the machine-learning aviation component detection model(s). At 1544, one or more of the machine-learning aviation component-detection models optionally can be replaced with one or more updated machine-learning aviation component-detection models re-trained using the image and user verification. At 1546, one or more of the machine-learning aviation component-status models optionally can be replaced with one or more updated machine-learning aviation component-status models re-trained using the image and user verification.

Any to all of the above steps can be repeated to inspect a plurality of different aviation components. Inspection information corresponding to different inspected aviation components can be aggregated into a digital inspection report and/or data store.

The herein described devices and methods use image recognition and machine learning techniques to comprehensively identify and classify aviation components to generate digital inspection reports for the aviation components in an automated manner. By generating a digital inspection report in such a manner, accuracy of reporting can be increased relative to a manual approach in which an inspection report is filled out by hand using a pen and paper. Further, an amount of time to generate the digital inspection report can be less than an amount of time to fill out an inspection report by hand. Accordingly, the herein described devices and methods can enable a reliability engineer to perform inspections of aviation components in a short amount of time relative to an approach in which the reliability engineer has to manually fill out inspection reports. Additionally, by generating digital inspection reports in such a manner, the digital inspection reports can be seamlessly stored in a data store with consistent and reliable categorization. Accordingly, aviation component inspection information can be tracked on a broad basis, such as for a fleet of aircraft.

Further, the disclosure comprises embodiments according to the following clauses:

Clause 1. An aviation component inspection device, comprising:
- a camera configured to capture images of an aviation component under inspection;
- a display;
- an input device; and
- a computer configured to:
  - receive an image of an aviation component from the camera,
  - evaluate the image of the aviation component with one or more machine-learning aviation component-detection models, each machine-learning aviation component-detection model of the one or more machine-learning aviation component-detection models previously trained to output at least one confidence score indicating a confidence that a corresponding aviation component is present in the image,
  - present, via the display, a list of candidate aviation components based on corresponding confidence scores output by the one or more machine-learning aviation component-detection models, and
  - add data previously associated with a selected candidate aviation component from the list to a digital inspection report responsive to user verification, via the input device, confirming the selected candidate aviation component is present in the image.

Clause 2. The aviation component inspection device of clause 1, wherein the data previously associated with the selected candidate aviation component comprises an Air Transportation Association identification code.

Clause 3. The aviation component inspection device of any of clauses 1 or 2, further comprising a locator configured to add, to the digital inspection report, a location of the selected candidate aviation component.

Clause 4. The aviation component inspection device of any of clauses 1, 2, or 3, wherein the locator is configured to determine the location of the selected candidate aviation component based on machine-vision analysis of the image.

Clause 5. The aviation component inspection device of any of clauses 1, 2, 3, or 4, further comprising a location sensor, and wherein the locator is configured to determine the location of the selected candidate aviation component based on information from the location sensor.

Clause 6. The aviation component inspection device of any of clauses 1, 2, 3, 4, or 5, wherein the one or more machine-learning aviation component-detection models comprises a convolutional neural network.

Clause 7. The aviation component inspection device of any of clauses 1, 2, 3, 4, 5, or 6, wherein the one or more machine-learning aviation component-detection models are previously trained to collectively output a confidence score indicating a confidence for each different aviation component on an inspection checklist.

Clause 8. The aviation component inspection device of any of clauses 1, 2, 3, 4, 5, 6, or 7, further comprising:
- a communication interface configured to communicatively couple, via a computer network, the aviation component inspection device with a remote computer configured to maintain a data store of digital inspection reports; and
- wherein the computer is configured to send, via the communication interface, the digital inspection report to the remote computer for inclusion in the data store of digital inspection reports.

Clause 9. The aviation component inspection device of any of clauses 1, 2, 3, 4, 5, 6, 7 or 8, wherein the computer is configured to:
- evaluate the image with one or more machine-learning aviation component-status models, each machine-learning aviation component-status model of the one or more machine-learning aviation component-status models previously trained to output a confidence score indicating a confidence that the selected candidate aviation component has a corresponding operational status,
- present, via the display, a list of candidate operational statuses based on corresponding confidence scores output by the one or more machine-learning aviation component-status models, and
- add a selected operational status of the selected candidate aviation component from the list of candidate operational statuses to the digital inspection report responsive to user verification, via the input device, confirming the selected candidate aviation component has the selected candidate operational status.

Clause 10. The aviation component inspection device of any of clauses 1, 2, 3, 4, 5, 6, 7, 8, or 9, wherein the computer is configured to:
- present, via the display, an operational status entry prompt in addition to the list of candidate operational statuses, and
- add an identified operational status of the selected candidate aviation component not included in the list of candidate operational statuses to the digital inspection report responsive to receiving user input identifying the operational status.

Clause 11. The aviation component inspection device of any of clauses 1, 2, 3, 4, 5, 6, 7, 8, 9, or 10, wherein the computer is configured to:
- present, via the display, an aviation component entry prompt in addition to the list of candidate components, and add data previously associated with an identified aviation component not included in the list of candidate aviation components to the digital inspection report responsive to receiving user input identifying the aviation component.

Clause 12. The aviation component inspection device of any of clauses 1, 2, 3, 4, 5, 6, 7, 8, 9, 10, or 11, wherein the computer is configured to:
replace the one or more machine-learning aviation component-detection models with updated machine-learning aviation component-detection models re-trained using the image and user verification.

Clause 13. The aviation component inspection device of any of clauses 1, 2, 3, 4, 5, 6, 7, 8, 9, 10, 11, or 12, wherein the camera, the display, the input device, and the computer are physically combined in a device enclosure having a mobile form factor.

Clause 14. A method performed by a computer, the method comprising:
receiving an image of an aviation component from a camera;
computer evaluating the image of the aviation component with one or more machine-learning aviation component-detection models, each machine-learning aviation component-detection model of the one or more machine-learning aviation component-detection models previously trained to output a confidence score indicating a confidence that a corresponding aviation component is present in the image;
outputting a list of candidate aviation components based on corresponding confidence scores output by the one or more machine-learning aviation component-detection models; and
adding data previously associated with a selected candidate aviation component from the list to a digital inspection report responsive to user verification confirming the selected candidate aviation component is present in the image.

Clause 15. The method of clause 14, wherein the data previously associated with the selected candidate aviation component comprises an Air Transportation Association identification code.

Clause 16. The method of any of clauses 14 or 15, further comprising:
determining a location of the selected candidate aviation component based on one or both of machine-vision analysis of the image and information from a location sensor; and
adding the location of the selected candidate aviation component to the digital inspection report.

Clause 17. The method of any of clauses 14, 15, or 16, further comprising:
computer evaluating the image with one or more machine-learning aviation component-status models, each machine-learning aviation component-status model of the one or more machine-learning aviation component-status models previously trained to output a confidence score indicating a confidence that the selected candidate aviation component has a corresponding operational status;
outputting a list of candidate operational statuses based on corresponding confidence scores output by the one or more machine-learning aviation component-status models; and
adding a selected operational status of the selected candidate aviation component from the list of candidate operational statuses to the digital inspection report responsive to user verification confirming the selected candidate aviation component has the selected candidate operational status.

Clause 18. The method of any of clauses 14, 15, 16, or 17, further comprising:
replacing the one or more machine-learning aviation component-detection models with updated machine-learning aviation component-detection models re-trained using the image and user verification.

Clause 19. A method performed by a computer, the method comprising: receiving an image of an aviation component from a remote computer via a computer network;
evaluating the image of the aviation component with one or more machine-learning aviation component-detection models, each machine-learning aviation component-detection model of the one or more machine-learning aviation component-detection models previously trained to output at least one confidence score indicating a confidence that a corresponding aviation component is present in the image;
determining a list of candidate aviation components based on corresponding confidence scores output by the one or more machine-learning aviation component-detection models;
sending the list of candidate components to the remote computer via the computer network; and
adding a selected candidate component from the list of candidate aviation components to a digital inspection report responsive to receiving user verification, from the remote computer via the computer network, confirming the selected candidate component is present in the image.

Clause 20. The method of clause 19, further comprising:
including the digital inspection report in a database of digital inspection reports maintained by the computer.

To the extent that terms "includes," "including," "has," "contains," and variants thereof are used herein, such terms are intended to be inclusive in a manner similar to the term "comprises" as an open transition word without precluding any additional or other elements.

The present disclosure includes all novel and non-obvious combinations and subcombinations of the various features and techniques disclosed herein. The various features and techniques disclosed herein are not necessarily required of all examples of the present disclosure. Furthermore, the various features and techniques disclosed herein may define patentable subject matter apart from the disclosed examples and may find utility in other implementations not expressly disclosed herein.

The invention claimed is:

1. An aviation component inspection device, comprising:
a camera configured to capture images of an aviation component under inspection;
a display;
an input device; and
a computer configured to:
receive an image of an aviation component from the camera,
evaluate the image of the aviation component with one or more machine-learning aviation component-detection models, each machine-learning aviation component-detection model of the one or more machine-learning aviation component-detection models previously trained to output at least one confidence score indicating a confidence that a corresponding aviation component is present in the image, present, via the display, a component list including a plurality of candidate aviation components based on corresponding confidence scores output by the one or more machine-learning aviation component-detection models, add data previously associated with a selected candidate aviation component from the component list to a digital inspection report responsive to user verification, via the input device, confirming the selected candidate aviation component is present in the image, evaluate the image with one or more machine-learning aviation component-status models to generate a status list including a plurality of candidate operational statuses for the selected candidate aviation component, each machine-learning aviation component-status model of the one or more machine-learning aviation component-status models previously trained to output a confidence score indicating a confidence that the selected candidate aviation component has a corresponding operational status, and add a candidate operational status from the status list to the digital inspection report.

2. The aviation component inspection device of claim 1, wherein the data previously associated with the selected candidate aviation component comprises an Air Transportation Association identification code.

3. The aviation component inspection device of claim 1, further comprising a locator configured to determine a location of the selected candidate aviation component, and wherein the computer is configured to add the location of the selected candidate aviation component to the digital inspection report.

4. The aviation component inspection device of claim 3, wherein the locator is configured to determine the location of the selected candidate aviation component based on machine-vision analysis of the image.

5. The aviation component inspection device of claim 3, further comprising a location sensor, and wherein the locator is configured to determine the location of the selected candidate aviation component based on information from the location sensor.

6. The aviation component inspection device of claim 1, wherein the one or more machine-learning aviation component-detection models comprises a convolutional neural network.

7. The aviation component inspection device of claim 1, wherein the one or more machine-learning aviation component-detection models are previously trained to collectively output a confidence score indicating a confidence for each different aviation component on an inspection checklist.

8. The aviation component inspection device of claim 1, further comprising:

a communication interface configured to communicatively couple, via a computer network, the aviation component inspection device with a remote computer configured to maintain a data store of digital inspection reports; and wherein the computer is configured to send, via the communication interface, the digital inspection report to the remote computer for inclusion in the data store of digital inspection reports.

9. The aviation component inspection device of claim 1, wherein the computer is configured to:

present, via the display, the status list including the plurality of candidate operational statuses based on corresponding confidence scores output by the one or more machine-learning aviation component-status models, and add the selected candidate operational status of the selected candidate aviation component from the status list to the digital inspection report responsive to user verification, via the input device, confirming the selected candidate aviation component has the selected candidate operational status.

10. The aviation component inspection device of claim 9, wherein the computer is configured to:

present, via the display, an operational status entry prompt in addition to the status list including the plurality of candidate operational statuses, and add an identified operational status of the selected candidate aviation component not included in the status list including the plurality of candidate operational statuses to the digital inspection report responsive to receiving user input identifying the operational status.

11. The aviation component inspection device of claim 1, wherein the computer is configured to:

present, via the display, an aviation component entry prompt in addition to the component list including the plurality of candidate aviation components, and add data previously associated with an identified aviation component not included in the component list including the plurality of candidate aviation components to the digital inspection report responsive to receiving user input identifying the aviation component.

12. The aviation component inspection device of claim 1, wherein the computer is configured to:

replace the one or more machine-learning aviation component-detection models with updated machine-learning aviation component-detection models re-trained using the image and user verification.

13. The aviation component inspection device of claim 1, wherein the camera, the display, the input device, and the computer are physically combined in a device enclosure having a mobile form factor.

14. A method performed by a computer, the method comprising:

receiving an image of an aviation component from a camera;

evaluating the image of the aviation component with one or more machine-learning aviation component-detection models, each machine-learning aviation component-detection model of the one or more machine-learning aviation component-detection models previously trained to output a confidence score indicating a confidence that a corresponding aviation component is present in the image;

outputting a component list including a plurality of candidate aviation components based on corresponding confidence scores output by the one or more machine-learning aviation component-detection models;

adding data previously associated with a selected candidate aviation component from the component list to a digital inspection report responsive to user verification confirming the selected candidate aviation component is present in the image;

evaluating the image with one or more machine-learning aviation component-status models to generate a status list including a plurality of candidate operational statuses for the selected candidate aviation component, each machine-learning aviation component-status model of the one or more machine-learning aviation component-status models previously trained to output a confidence score indicating a confidence that the selected candidate aviation component has a corresponding operational status; and adding a candidate operational status from the status list to the digital inspection report.

15. The method of claim 14, wherein the data previously associated with the selected candidate aviation component comprises an Air Transportation Association identification code.

16. The method of claim 14, further comprising:

determining a location of the selected candidate aviation component based on one or both of machine-vision analysis of the image and information from a location sensor; and adding the location of the selected candidate aviation component to the digital inspection report.

17. The method of claim 14, further comprising:

outputting the status list including the plurality of candidate operational statuses based on corresponding confidence scores output by the one or more machine-learning aviation component-status models; and adding the selected candidate operational status of the selected candidate aviation component from the status list including the plurality of candidate operational statuses to the digital inspection report responsive to user verification confirming the selected candidate aviation component has the selected candidate operational status.

18. The method of claim 14, further comprising:

replacing the one or more machine-learning aviation component-detection models with updated machine-learning aviation component-detection models re-trained using the image and user verification.

19. A method performed by a computer, the method comprising:

receiving an image of an aviation component from a remote computer via a computer network;

evaluating the image of the aviation component with one or more machine-learning aviation component-detection models, each machine-learning aviation component-detection model of the one or more machine-learning aviation component-detection models previously trained to output at least one confidence score indicating a confidence that a corresponding aviation component is present in the image;

determining a component list including a plurality of candidate aviation components based on corresponding confidence scores output by the one or more machine-learning aviation component-detection models;

sending the component list including the plurality of candidate aviation components to the remote computer via the computer network;

adding a selected candidate aviation component from the list including the plurality of candidate aviation components to a digital inspection report responsive to receiving user verification, from the remote computer via the computer network, confirming the selected candidate aviation component is present in the image;

evaluating the image with one or more machine-learning aviation component-status models to generate a status list including a plurality of candidate operational statuses for the selected candidate aviation component, each machine-learning aviation component-status model of the one or more machine-learning aviation component-status models previously trained to output a confidence score indicating a confidence that the selected candidate aviation component has a corresponding operational status; and adding a candidate operational status from the status list to the digital inspection report.

20. The method of claim 19, further comprising:

including the digital inspection report in a database of digital inspection reports maintained by the computer.

\* \* \* \* \*